United States Patent
Sethi et al.

(10) Patent No.: US 10,608,997 B1
(45) Date of Patent: Mar. 31, 2020

(54) CONTEXT-BASED DATA ACCESS CONTROL

(71) Applicant: Amazon Technologies, Inc., Seattle, WA (US)

(72) Inventors: Tushaar Sethi, Seattle, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 14/751,022

(22) Filed: Jun. 25, 2015

(51) Int. Cl.
*H04L 29/06* (2006.01)

(52) U.S. Cl.
CPC ........ *H04L 63/0428* (2013.01); *H04L 63/123* (2013.01)

(58) Field of Classification Search
CPC .............. H04L 63/0428; H04L 63/123; G06Q 20/3823; G06Q 20/3825; G06Q 20/367; G06F 2221/0711; G06F 2221/2153
See application file for complete search history.

(56) References Cited

U.S. PATENT DOCUMENTS

| | | | | |
|---|---|---|---|---|
| 6,327,578 B1 * | 12/2001 | Linehan | ................. | G06Q 20/02 705/65 |
| 8,490,168 B1 * | 7/2013 | Holloway | ........... | H04L 63/0815 709/229 |
| 2008/0222049 A1 * | 9/2008 | Loomis | ................. | G06Q 20/10 705/75 |
| 2014/0372319 A1 * | 12/2014 | Wolovitz | ............... | G06Q 30/06 705/71 |
| 2016/0078397 A1 * | 3/2016 | Barton | ................. | G06Q 20/322 705/67 |

OTHER PUBLICATIONS

"EMV® Payment Tokenisation Specification—Technical Framework," Version 1.0, EMVCo, LLC, Mar. 2014, 84 pages.

* cited by examiner

*Primary Examiner* — Ellen Tran
(74) *Attorney, Agent, or Firm* — Davis Wright Tremaine LLP

(57) ABSTRACT

The current document describes systems and methods that provide access controls in a system of interconnected services such as an online service platform. In various implementations, the system maintains contextual information associated with tokenized data. In additional implementations, data brokers authorize access to detokenized data by comparing the context of the data to the context of the service requesting the data. In yet additional implementations, the system maintains contextual information associated with requests that are processed within the system. When a request is made to a particular service, the particular service can use the identity of the requester, the context of the request, and the context of the data to determine whether the request is authorized. In some implementations, the integrity of contextual information is protected using a digital signature.

20 Claims, 12 Drawing Sheets

US 10,608,997 B1

CONTEXT-BASED DATA ACCESS CONTROL

BACKGROUND

Access control is an important aspect of implementing an online service platform. An online service platform may be constructed from a number of interconnected frontend and backend services that work together to implement the services provided by the online service platform. In many implementations, the access control schemes that determine authorization between the frontend and backend services are based on authenticating the identities of the services that are parties to a request. For example, a particular client-facing website may be authorized to use a backend payment service based on access controls on the payment service that authenticate the identity of the website. In such environments, access control lists are maintained by the online service platforms that specify particular functional application programming interfaces ("APIs") and data that are accessible to the authenticated clients and servers.

In some large-scale online service platforms, various backend payment services, shipping services, ordering services, and other common services may be shared by multiple client-facing service platforms. In such environments, information associated with different client-facing service platforms may be mixed together on backend services that are shared by the different client-facing platforms. For example, two independent merchant websites may use the same backend payment service, and both independent merchant websites may be authorized to use the backend payment service. However, in many situations, each independent merchant website should not have access to payment information obtained from the other independent merchant website. As a result, service platform administrators carefully design access controls to mitigate this risk to the extent possible.

BRIEF DESCRIPTION OF THE DRAWINGS

Various embodiments in accordance with the present disclosure will be described with reference to the drawings, in which.

DETAILED DESCRIPTION

Figure 1:
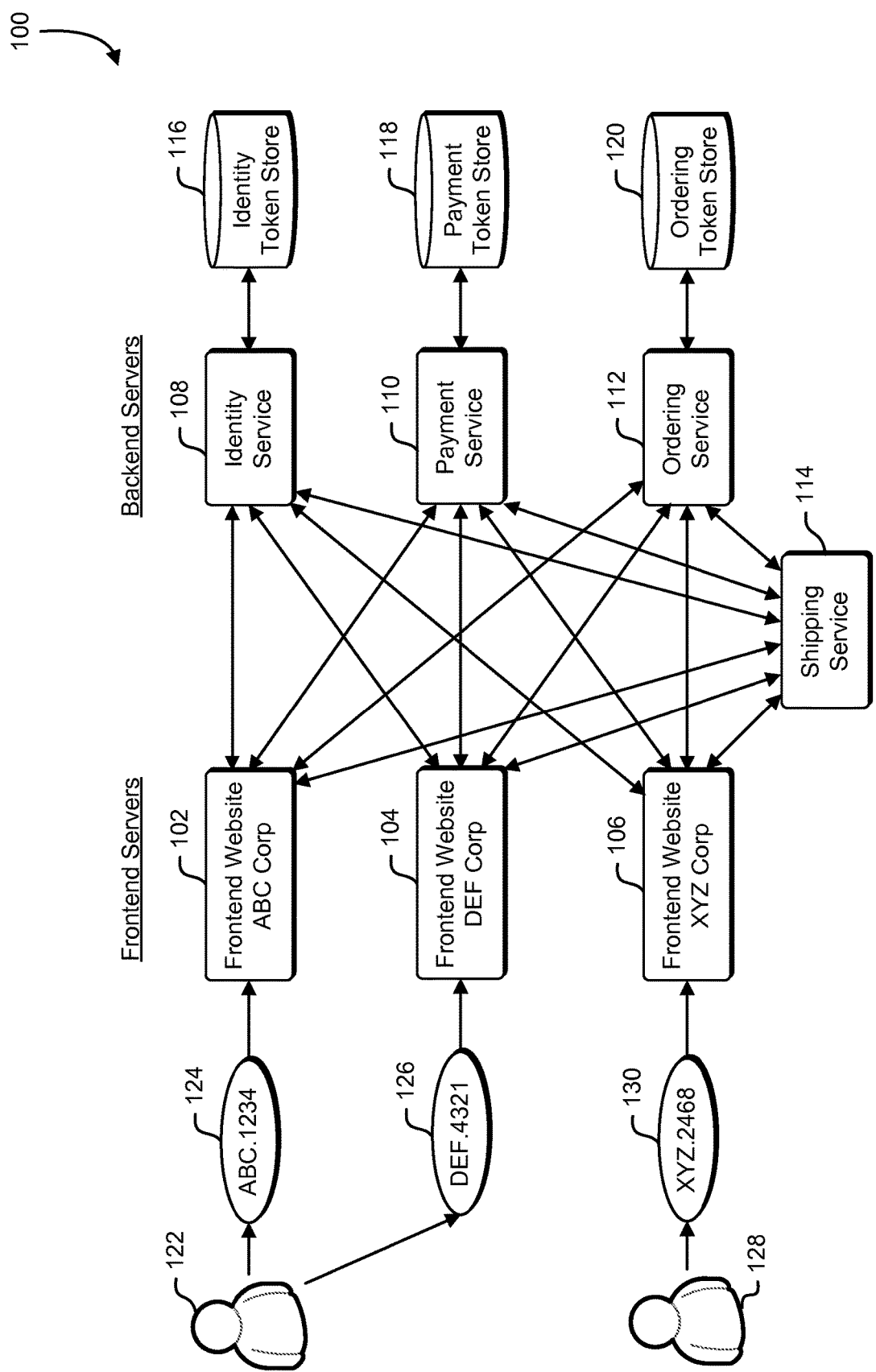
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods that implement, for a service, access controls that are based at least in part on contextual information associated with a request and/or contextual information of data associated with the request. In various implementations, a service platform includes a number of frontend and backend services. For example, the frontend services can be merchant websites, online computing resource servers, or other client-facing services. The backend services may include a variety of shared services such as payment services, identity services, shipping services, ordering services, or other services that are shared amongst the frontend services. In many implementations, service platforms retain data in data brokers that store and tokenize the data. In response to authorized requests, the data brokers tokenize (store data and return a token) and/or detokenize (return stored data that is associated with a provided token) data for various frontend and backend services in the service platform. In some implementations, requests to data brokers are authorized based at least in part on the authenticated identity of the service submitting the request. In various embodiments, additional access controls can be created and enforced using contextual information associated with a request, and/or contextual information associated with tokenized data.

In various examples, contextual information is represented in a variety of formats. For example, a request context can be represented by an alphanumeric string, an integer identifier, a hexadecimal identifier, or a globally unique identifier ("GUID"). A data context can be represented using any of the above formats, but in many implementations, the data context is represented using the same format as the request context to facilitate comparisons of data and request contexts. Context can be added as an element of a data structure that represents request or data objects. In some examples, context is prepended or appended to data (either tokenized or plain text). Either data context or request context can be represented using a cryptographically verifiable signature or a cryptographic key.

In certain implementations, as data is acquired or generated, a data context is retained with the data that identifies a realm to which the data belongs. A realm is a set of data that is administered by a common authority. In some environments, a realm can be associated with a group of servers or services that administer a particular dataset. When the data is tokenized into a data token by a data broker, the data broker encapsulates the data context with the data token. In some implementations, the encapsulated data token is digitally signed using a cryptographic key. In one example, when a user registers an account with a service-providing website, the service-providing website stores the identifying information of the user and identity service. The identity service stores the identifying user such as name, address, phone number, and so on, and returns data tokens that include encapsulated contextual information that indicates that the data tokens are associated with the service-providing website. For example, an online merchant platform that services more than one business can use the data context to distinguish data associated with one business from data associated with another business, even when shared backend services perform operations on behalf of both merchants. In some implementations, the data tokens and associated context information are digitally signed using a cryptographic key associated with the data broker. If the data tokens are acquired by an unauthorized party, access controls in place on the data broker can prevent the detokenization of the data by services other than the service-providing website.

In certain implementations, when a request is received or handled by a service platform, a request context is retained with the request that identifies the origins of the request. For example, in some implementations, when a particular client sends a request to a service-providing website, the particular client includes contextual information with the request that identifies the request is originating with the particular client. The request can be digitally signed using a cryptographic key that is associated with the client. The service-providing website, as a result of receiving the request, may forward the request to a particular backend service. Before forwarding the request, the service-providing website adds contextual information describing the request as being relayed through the service-providing website. The additional contextual information can be digitally signed using a cryptographic key that is associated with the service-providing website.

In various implementations, services and data brokers within the service platform are able to use the contextual information of the request and the contextual information of the data associated with the request to implement access controls. For example, in one scenario, a particular client creates an account on the ABC website. The ABC website sends a request to a backend identity service to store the user's personal information. The request includes contextual information that identifies the request as coming from the ABC website. The backend identity service returns to the ABC website a token that includes contextual information specifying that the token is associated with the ABC website. The ABC website can request detokenization of the token and regain access to the user's personal information by making a request to the identity service that includes contextual information, signed by the ABC website, along with the token. When the context of the data matches the context of the request, the identity service grants the request by providing the user's personal information. If an attacker contacts the identity service and requests the user's personal information using the token, the context of the attacker's request will not match the context of the token and the request will be denied by the identity service.

FIG. 1 shows an illustrative example of an environment in which various embodiments may be practiced. A diagram 100 shows a service platform that includes three frontend servers: an ABC Corporation website 102, a DEF Corporation website 104, and an XYZ Corporation website 106. The frontend servers utilize a number of shared backend services: an identity service 108, a payment service 110, an ordering service 112, and a shipping service 114. Some of the backend services act as data brokers within the service platform. The identity service 108 brokers data associated with user identities in an identity token store 116. The payment service 110 brokers data associated with credit card information and other payment sources in a payment token store 118. The ordering service 112 brokers data associated with customer orders in an ordering token store 120. The shipping service 114 does not act as a data broker. In some implementations, a single data broker brokers the data for the service platform.

Tokenization functionality, including business/feature aware tokenization, may be used in additional environments. For example, brick-and-mortar merchants can use the tokenization functionality of backend servers to secure confidential information such as payment information, customer-identifying information, and purchase information. Context information can be added to other tokenization schemes such as EMV tokenization, thereby enabling the methods and systems described in this document to be applied in those environments. For example, context-aware tokenization may be applied in environments that include point-of-sale terminals, checkout stands, and cell phone or tablet based payment terminals.

In certain environments, users of the frontend services have credentials for each frontend service. For example, a first user 122 has an ABC Corporation credential 124 and a DEF Corporation credential 126. A second user 128 has an XYZ Corporation credential 130. The users enter their credentials via a user interface on a user device that sends the credentials to the frontend servers. The credentials entered by the first user 122 and the second user 128 include context information that describes the credential as being associated with a particular context. Context can be represented using an integer, descriptive string, cryptographic key, token, or identifier that is associated with the data or request. In the example shown in FIG. 1, a request context is represented as a string that is prepended to the credentials 124, 126, and 130. The context information provides metadata that can be used by services throughout the system to authorize requests. For example, the ABC Corporation credential 124 cannot be used by the first user 122 to access the DEF Corporation website 104 because the context of the credential does not match the context of the access request. In addition, when a particular credential is used by a particular frontend server as part of a request to a backend server, the context of the particular credential can be verified against the context of the particular frontend server. For example, when the ABC Corporation website 102 uses the ABC Corporation credential 124 to access identifying information about the user from the identity service 108, the identity service 108 validates that the context of the ABC Corporation credential 124 (ABC Corporation) matches the context of the request (ABC Corporation). If the context of the credential does not match the context of the request, the request will be denied. For example, if the ABC Corporation credential 124 were used by the DEF Corporation website 104 to access personal information from the identity service 108, the identity service would see that the context of the ABC Corporation credential 124 does not match the requester's context (DEF Corporation), and the request would be denied.

In some implementations, data that is handled within the service platform retains a context that can be used to provide refined access controls. In some implementations, data that enters the service platform is tagged with the context by a recipient of the data. For example, when the first user 122 places an order through the ABC Corporation website 102, the ABC Corporation website 102 submits the order to the ordering service 112, specifying that the order has a context of (ABC Corporation). The ordering service 112 receives the order, and verifies that the ABC Corporation website 102 is authorized to create order records with the (ABC Corporation) context. The ordering service 112 stores the order information in the ordering token store 120, and generates a token having the (ABC Corporation) context. The token is secured so that the context information cannot be modified without authorization. In some implementations, the token is signed by a data broker such as the ordering service. In another implementation, a platform-wide data broker signs the token. In yet another implementation, the token is signed by a server associated with the context of the data, for example data with the context of (ABC Corporation) may be signed by the ABC Corporation website 102. The token, with context information, is returned to the ABC Corporation website 102.

In another implementation, services within the service platform that act as data brokers generate and authenticate context information when issuing tokens for use within the service platform. For example, when the identity service 108 receives information about the identity of a user from the ABC Corporation website 102, the identity service 108 tokenizes the data and infers the context of the data from the frontend server that provided the data (the ABC Corporation website 102). The identity service 108 sets the context of the provided data to (ABC Corporation), and signs the token with a digital signature of the identity service 108. The token, with context information is returned to the ABC Corporation website 102.

In some implementations, contextual information that is associated with data is used to specify access controls. For example, in some implementations, data may only be used by particular services within the service platform that are associated with the same context as the data. In some implementations, data having a particular context may be used by particular services that have one of a number of contexts. For example, a number of affiliated company websites may have an access control policy that allows data to be shared across their associated frontend and backend services.

In additional implementations, requests processed within the service platform are accompanied by a request token that includes a context for the request. In some implementations, additional context is added to the request token as the request is processed by various services within the service platform. For example, a request that originates with the ABC Corporation website 102 has a context of (ABC Corporation) encoded in a request token. The request is sent to the shipping service 114, and the shipping service 114 makes additional related requests to the payment service 110. The shipping service 114 provides a request token that includes the context information from the original request, and additional context information for the shipping service 114. When the request is received by the payment service 110, the payment service 110 receives context information that reveals that the request from the shipping service 114 originated with the ABC Corporation website 102. In various implementations, request context information is encapsulated and signed by each service that processes the request. For example, when the ABC Corporation website 102 sends a request to the shipping service 114, the request context is signed by the ABC Corporation website 102. When the shipping service 114 makes a related request to the payment service 110, it adds the payment service request context to the context received by the ABC Corporation website 102. In some implementations, subsequent context encapsulates the previous request context. In another implementation, subsequent context is appended to the previous request context. Request context can be signed with a cryptographic signature of the requester.

In certain additional implementations, access controls may be based on a combination of request context and data context. A frontend service can originate a request that has a request context of the frontend service, and includes a parameter in the form of a data token with a particular data context. When the frontend service submits the request to an intermediate service, such as the shipping service 114, the intermediate service adds context information to the request when the intermediate service makes related calls to various backend services. When a backend service receives the request and the parameter, the backend service confirms that the context of the data is compatible with the context of the request. In some scenarios, the context of the data may be compatible with the context of the intermediate service. In another scenario, the context of the data may be compatible with the context of the originating frontend service. In yet another scenario, the context of the data may be incompatible with the context of the request, and the request may be denied.

Access control information that includes request context and data context can be maintained in a variety of ways. In some implementations, access control information is maintained centrally in a single server in the service platform. In another implementation, access control information is distributed amongst a number of servers within the service platform. For example, allowable combinations of data and request context can be maintained within backend servers that act as data brokers for data tokens having a particular context. In another example, backend services can maintain access control information that defines request contexts for which requests will be granted. In various implementations, access controls are maintained in a number of tables. A particular access control table defines access controls in terms of the identity of a requester, and a context of data requested. Another access control table defines access controls in terms of the context of a requester, and the context of data requested. In another implementation, access controls are maintained by storing allowable combinations of requester identity, request context, and data context.

In some implementations, requests are transmitted between different services within the same computer system via inter-process communication ("IPC"). In such implementations, a request context can include a process ID or socket used to communicate between processes. In additional implementations, requests can be transmitted between services running on a number of virtual machines. Requests may be transmitted from one virtual machine to another virtual machine via a virtual network. In some environments, requests are transmitted from one virtual machine to another virtual machine over a virtual network hosted by a single host computer system.

Figure 2:
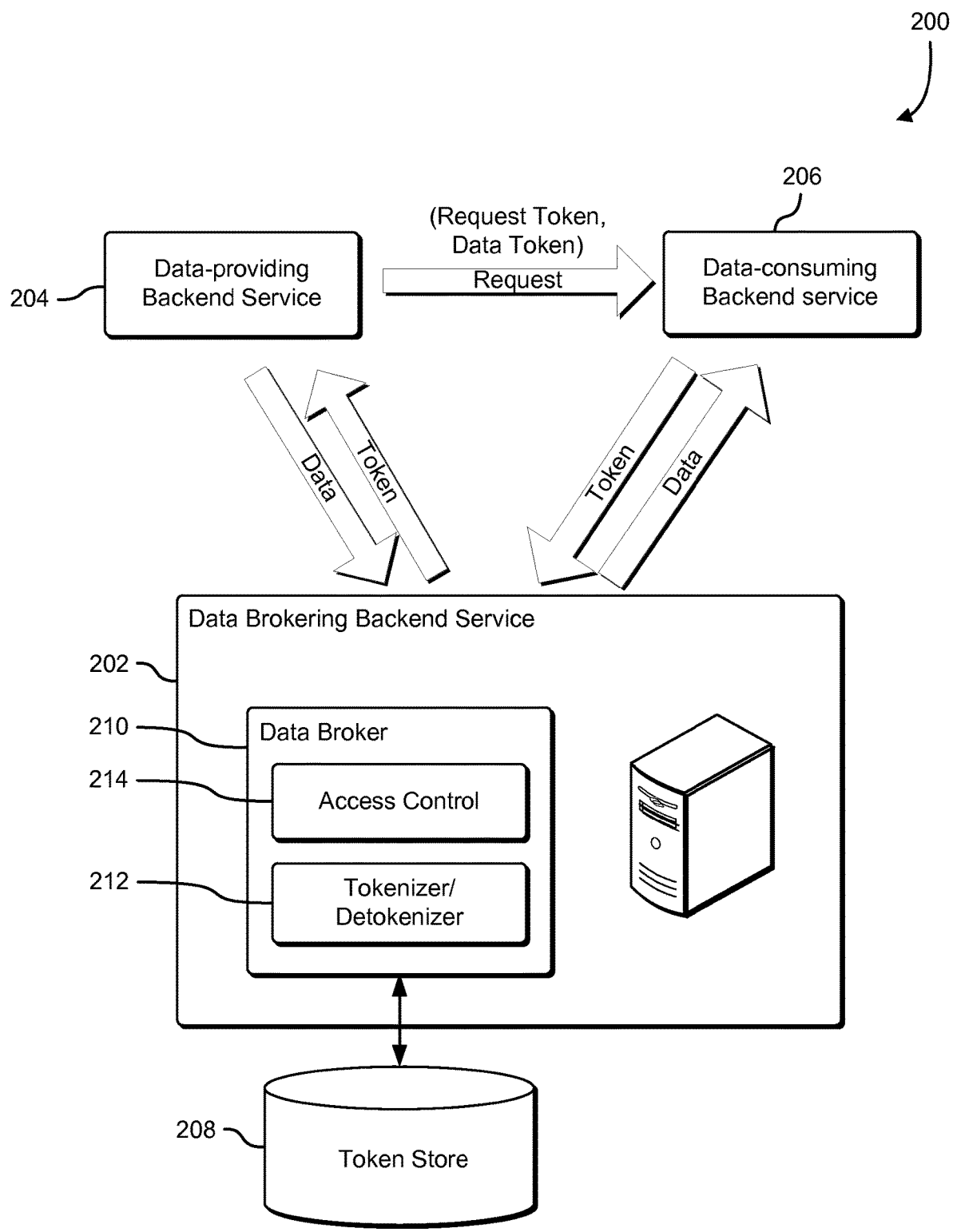
FIG. 2 shows an illustrative example of a backend service that brokers tokenized data, in accordance with an embodiment.

FIG. 2 shows an illustrative example of a backend service that brokers tokenized data, in accordance with an embodiment. A block diagram 200 illustrates a backend service 202 that brokers particular data associated with the backend service 202. A data-providing backend service 204 provides data to the backend service 202 and receives tokens that represent the provided data. A data-consuming backend service 206 receives a request, along with data, from the data-providing backend service 204. The data-consuming backend service 206 requests detokenization from the backend service 202, providing the token, and receiving the data as a result. The backend service 202 maintains tokenized data, in tokenized and untokenized forms, in a token store

208. The token store is accessed by a data broker 210 that is part of the backend service 202. The data broker 210 includes a tokenizer/detokenizer module 212 and an access control module 214. The data broker 210, and the code components of the data broker 210 include executable instructions that, when executed, perform functions associated with converting data to and from tokenized form.

In various implementations, the tokenizer/detokenizer module 212 performs the operations of converting plaintext data into tokens, and converting tokens into plaintext data. In some implementations, tokens are in the form of an iterated value such as an integer or hexadecimal value. In another implementation, tokens are in the form of a pseudo-randomly generated identifier such as a global unique identifier ("GUID"). In yet another implementation, tokens are produced using a format-preserving cipher. For example, a credit card number of the form XXXX XXXX XXXX XXXX such as 1234 5678 9012 3456 may be represented by a token that also has a form XXXX XXXX XXXX XXXX such as 9876 5432 1098 7654. The credit card number and the token for the credit card number share a format but have different values.

Randomly selected or pseudo-randomly generated identifiers may be created by using a seed value and a pseudo-random number generation algorithm. For example, seed values may be based at least in part on a system clock, or values read from uninitialized memory locations, or using a hardware random number generator that reads a physical signal having a large noise component. Pseudorandom number generation algorithms include algorithms based at least in part on cyclic redundancy codes, or linear feedback shift registers.

When tokenizing data, tokenizer/detokenizer module 212 records the context for the produced token. In some implementations, the context is suggested by the service requesting tokenization. For example, the data-providing backend service 204 may provide, along with data to be tokenized, a suggested context for the token. The tokenizer/detokenizer module 212 assigns the suggested context to the token provided that the data-providing backend service 204 is authorized to tokenize data for the suggested context. In some implementations, the authorization of the data-providing backend service 204 to tokenize data is determined by the access control module 214. In another implementation, the context of data is set by the data broker 210. When the data-providing backend service 204 provides data to the data broker 210, the data broker 210 confirms the identity of the data-providing backend service 204, and infers a context for the data based at least in part on the identity of the data-providing backend service 204. For example, if the ABC Corporation website sends data to the data broker 210 to be tokenized, the data broker 210 identifies the ABC Corporation website, and infers that the context of the provided data is (ABC Corporation). In various implementations, when data is tokenized by the data broker 210, the data broker 210 signs the provided token with a cryptographic key of the data broker 210.

In various implementations, the data broker 210 relies on access controls maintained and administered by the access control module 214. The access control module 214 performs operations that authorize the tokenization and detokenization of data. Authorization may be based on one or more of the identity of the requester, the context of the request, and the context of the data requested or provided.

Figure 3:
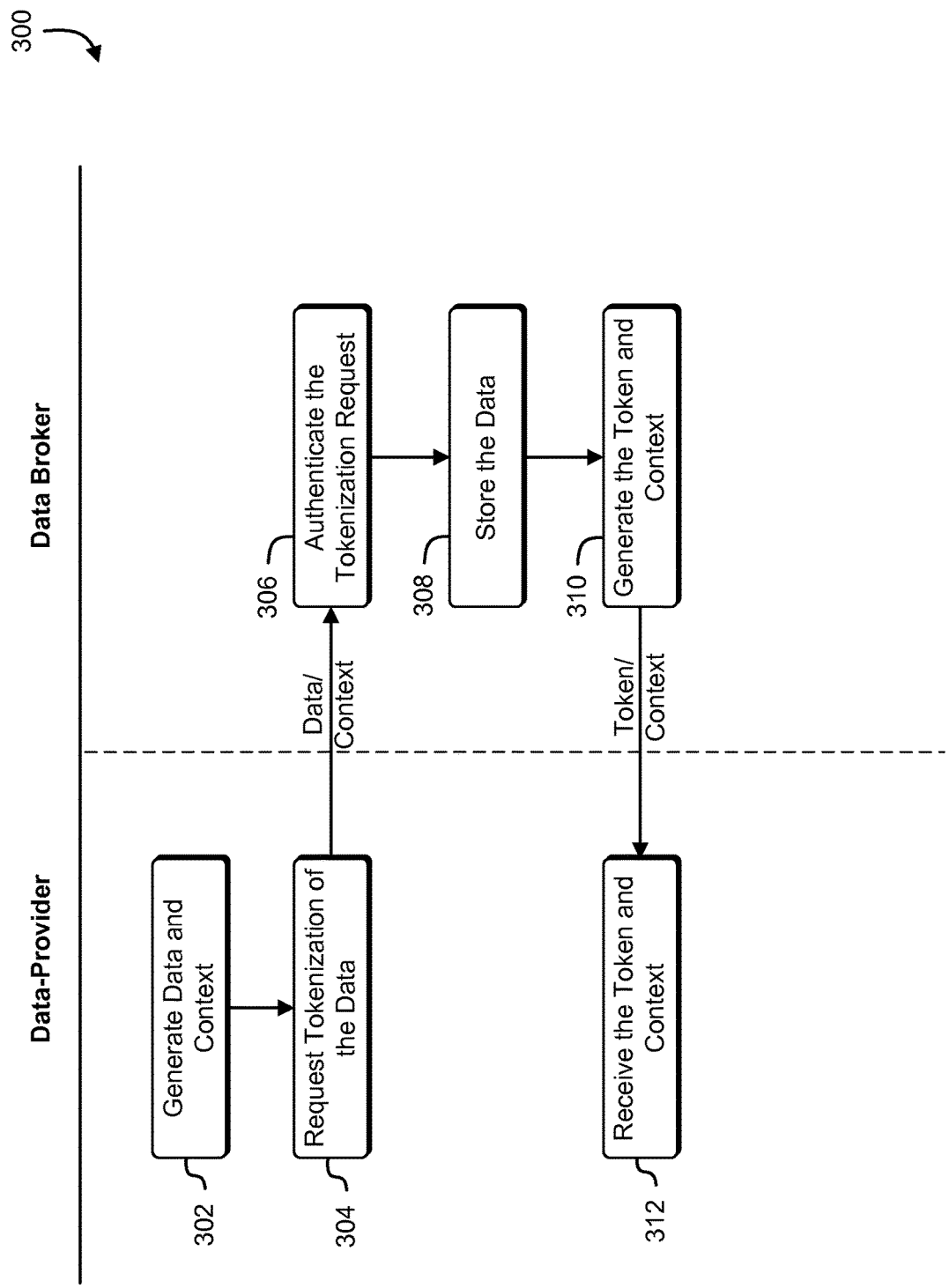
FIG. 3 shows an illustrative example of a process that, when performed by a service platform, provides tokenized data in accordance with an embodiment.

FIG. 3 shows an illustrative example of a process that, when performed by a service platform provides tokenized data in accordance with an embodiment. A swim diagram 300 illustrates a process performed by a data-provider, and a data broker. The data-provider generates 302 data, and an associated data context. In some implementations, the data is received from another service and the data context is inferred from the identity of the other service. In another implementation, the data is created by the data-provider as a result of a particular operation, and is assigned a context of the data-provider. In yet another implementation, the data is provided to the data-provider through user input, and the data context is assigned the context of the data-provider. At block 304, the data-provider creates a request token that includes a request context of the data-provider that is digitally signed by the data-provider. The request token with the request context, and the data token with the data context, are sent to the data broker as part of a request to tokenize the data token. The data broker authenticates 306 the tokenization request. In some implementations, the data broker authenticates the tokenization request by verifying the identity of the data-provider. In another implementation, the data broker authenticates the tokenization request by verifying that the context of the request token matches the context of the data. In yet another implementation, the data broker authenticates the tokenization request by verifying that the context of the request is compatible with, or allows, tokenization operations for the specified data context. When the tokenization request is not authorized, the request is denied. When the tokenization request is authorized, execution proceeds to block 308 and the data broker stores the data in a token store. The data broker generates a data token with the data context provided by the data-provider. In some implementations, the data token is constructed using format-preserving encryption. In another implementation, the token is constructed by incrementing a counter. In yet another implementation, the token is constructed by generating a GUID. The generated data token and data context are signed using a digital signature of the data broker, and returned to the data-provider. At block 312, the data-provider receives the generated data token and data context.

Figure 4:
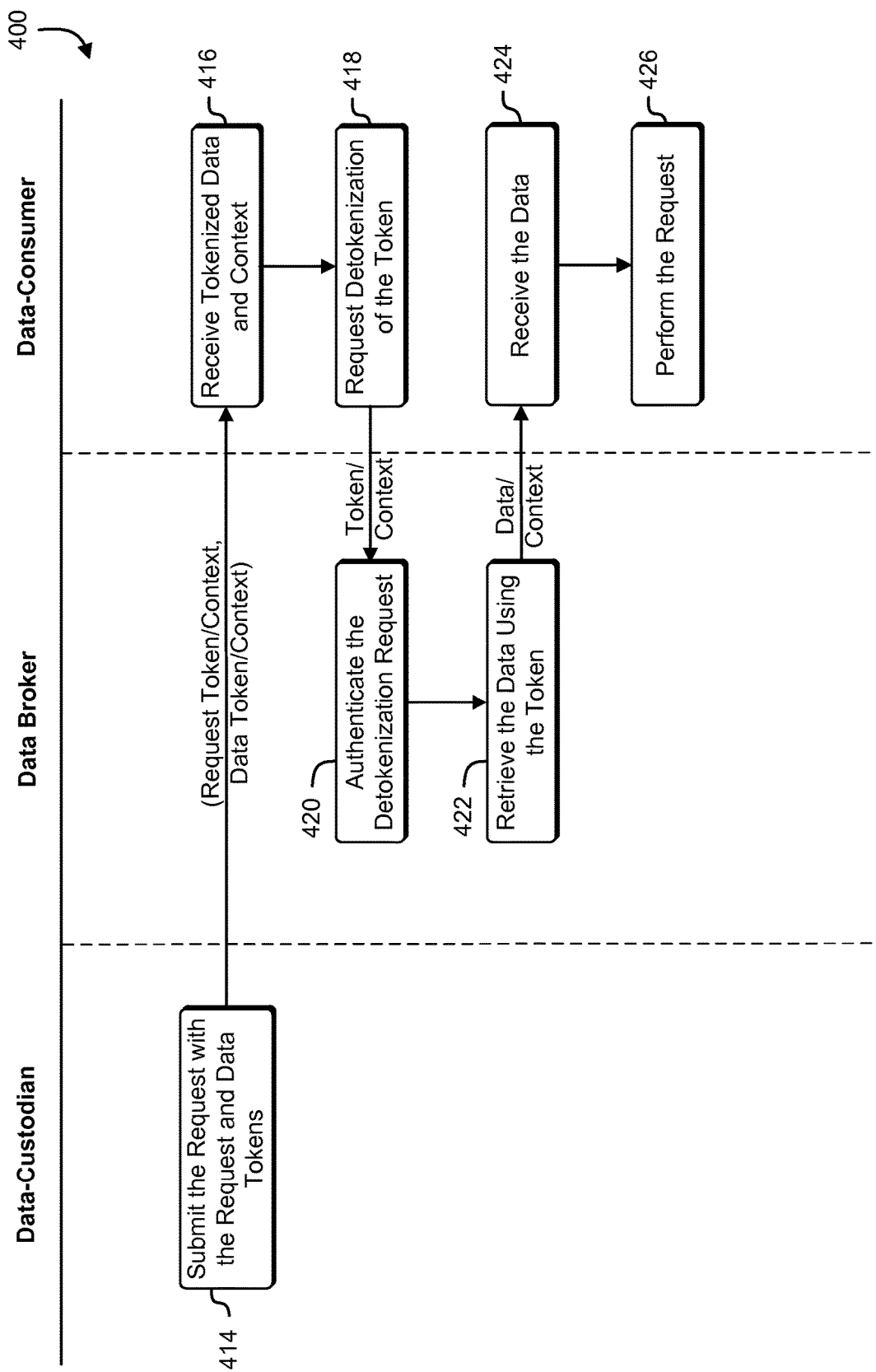
FIG. 4 shows an illustrative example of a process that, when performed by a service platform, processes a request in accordance with an embodiment.

FIG. 4 shows an illustrative example of a process that, when performed by a service platform, processes a request in accordance with an embodiment. A swim diagram 400 illustrates a process performed by a data-custodian, a data broker, and a data-consumer. At block 414, a data-custodian generates a request token and sends a tokenized request to a data-consumer. The request token includes a request context that is associated with the data-custodian. The data token and data context are encapsulated within the request token, and the entire request token is digitally signed by the data-custodian. In some implementations, requests are made between the data-custodian and the data-consumer by calling an application programming interface ("API") on the data-consumer. In another implementation, requests are made between the data-custodian and the data-consumer by specifying a particular operation to be performed within the request token. At block 416, the data-consumer receives the request token that includes the data token. Since the request token includes the request context and the data context, the data-consumer may authorize the request based on the identity of the data-custodian, the context of the request, and the context of the data. If the request is not authorized, the request is denied. When the request is authorized, execution proceeds to block 418 where the data-consumer detokenizes the tokenized data received with the request.

In order to process the request, the data-consumer detokenizes the data associated with the request, and performs the requested operation. At block 418, the data-consumer creates a detokenizing request to detokenize the received data token. The detokenizing request token has a context of the data-consumer, and encapsulates the data token to be detokenized. The assembled detokenizing request token is digitally signed by the data-consumer and sent to the data broker. The data broker can authorize the detokenizing request based at least in part on the identity of the data-consumer, the context of the detokenizing request, and the context of the data to be detokenized. If the detokeizing request is not authorized, the request is denied and the data is not detokenized. When the detokenizing request is authorized, execution proceeds to block 422 where the data broker retrieves the data from a token data store using the token, and returns the data along with the data context to the data-consumer. At block 424, the data-consumer receives the data. In some implementations, the data-consumer detokenizes additional data that may be used to perform the requested operation. At block 426, the data-consumer performs the request operation and may, in some implementations, use the detokenized data to perform the requested operation.

In some implementations, the data-consumer may return a result to the data-custodian. For example, the data-consumer may generate a result from the requested operation, and tokenize the result by sending the result to the data broker and receiving a corresponding result token with a result context. The result token can be returned to the data-custodian, and the data-custodian can detokenize the result token to examine the result.

Figure 5:
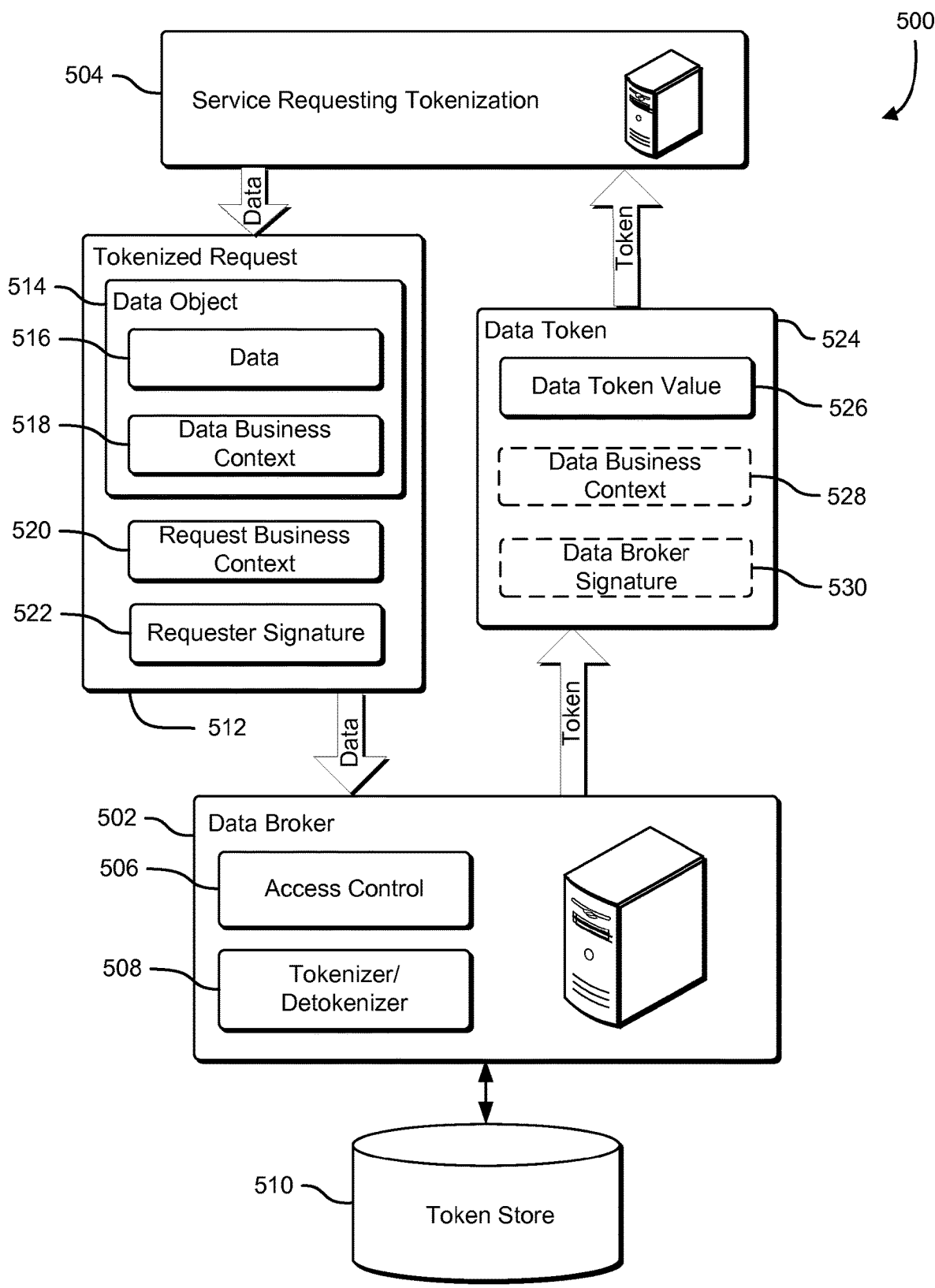
FIG. 5 shows an illustrative example of a data broker that tokenizes data, in accordance with an embodiment.

FIG. 5 shows an illustrative example of a data broker that tokenizes data, in accordance with an embodiment. A block diagram 500 shows a data broker 502 performing a tokenization operation for a requesting service 504. In various implementations, the requesting service 504 is a frontend service, an intermediate service, or another data-brokering backend service. The data broker 502 includes an access control module 506 and a tokenizer/detokenizer module 508. The tokenizer/detokenizer module 508 stores tokenization information in a token store 510. In various implementations, the token store 510 maintains the tokenization information in a database where tokenized data is indexed by the token that represents the tokenized data. As described above, tokens can take a variety of forms including sequential values, globally unique identifiers, format-preserving tokens, or pseudo-randomly generated values.

When the requesting service 504 sends a request to the data broker 502, a tokenized request 512 is generated by the requesting service 504. The tokenized request 512 includes a data object 514. The data object 514 includes a data field 516 that holds the plaintext data. A data context 518 is included in the data object 514 that suggests to the data broker 502 the context of the data field 516. The tokenized request 512 includes a request context 520 that has a value of the requesting service's context. The requesting service 504 digitally signs the tokenized request 512 with a requester signature 522.

In various embodiments, data objects such as data tokens, tokenized requests, data contexts, and request contexts may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

When the data broker 502 receives the tokenized request 512, the access control module 506 authenticates the requester signature 522, and confirms that the requester is authorized to make requests having the request context 520, and that the request context 520 is compatible with the data context 518. The tokenizer/detokenizer module 508 generates a token based at least in part on the information in the data field 516 having the data context provided by the tokenized request 512. The tokenizer/detokenizer module 508 stores the plaintext data and the generated data token in the token store 510. The data broker 502 provides a data token 524 in response to the request from the requesting service 504. The data token 524 includes a data token value field 526, a data context field 528, and a digital signature field 530. The data token value field 526 holds the value of the generated data token. The data context field 528 holds the value of the data context 518. The digital signature field 530 contains a cryptographic signature of the data broker 502.

In some embodiments, the data context field 528 and the digital signature field 530 are omitted from the data token 524. The requesting service 504 queries the data broker 502, which retains the data context and digital signature for the token. The data broker 502 provides the data context and digital signature on demand, thereby eliminating the necessity of transmitting this information with the data token 524.

When the requesting service 504 receives the data token 524, the requesting service 504 verifies the digital signature of the data broker 502. The data token 524 can be used by the requesting service 504 as part of additional requests to other services. When the data token 524 is used as part of additional requests, the data token 524 is encapsulated with a new request token which is signed by the requesting service 504. A recipient of an additional request can request that the data broker 502 detokenize the data token 524 provided that the context of the new request is compatible with the context the data token 524.

Figure 6:
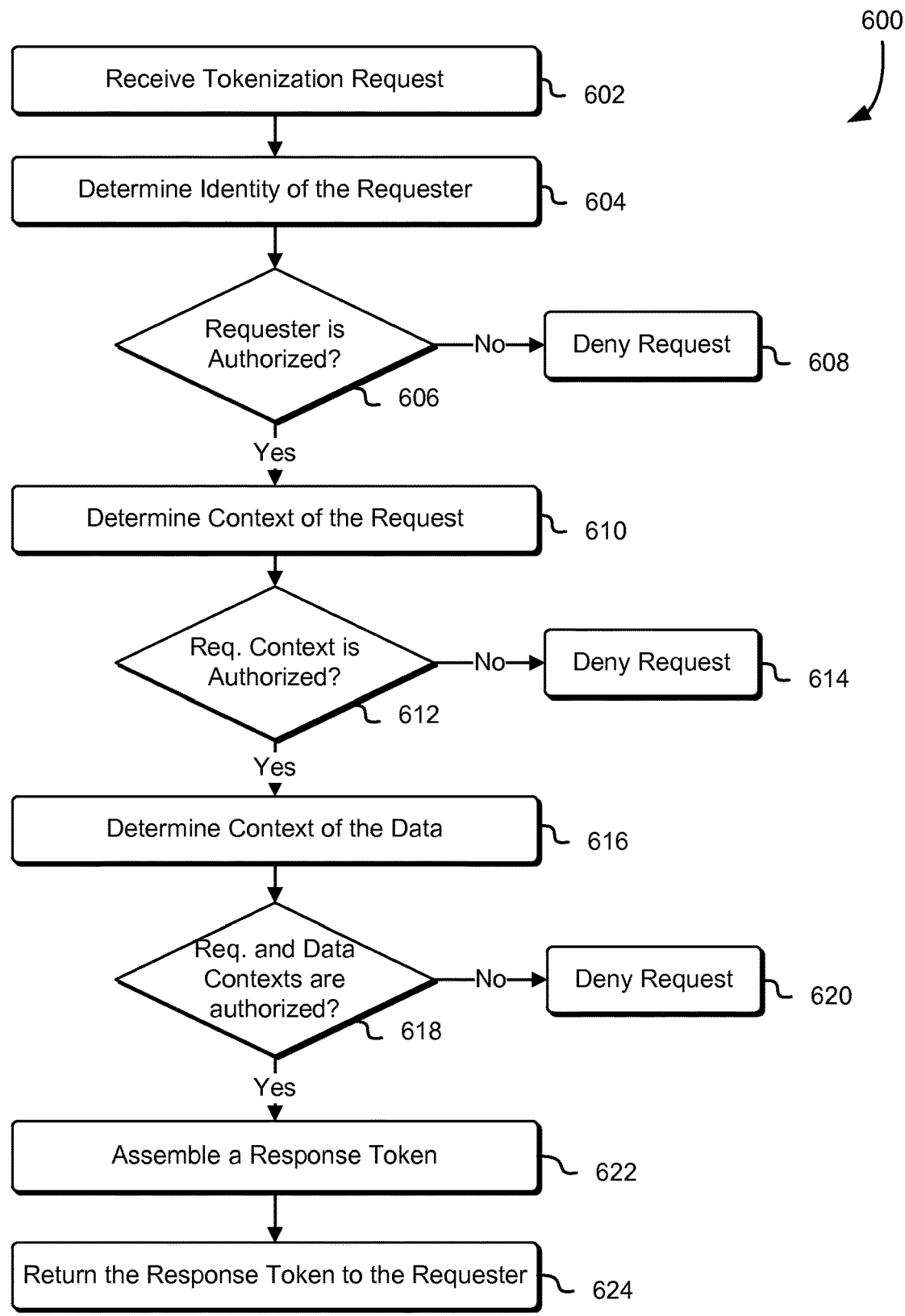
FIG. 6 shows an illustrative example of a process that, when performed by a data broker, tokenizes data in accordance with an embodiment.

FIG. 6 shows an illustrative example of a process that, when performed by a data broker, tokenizes data in accordance with an embodiment. A flowchart 600 illustrates a process that begins at block 602 where the data broker receives a request to tokenize data. In some implementations, the request takes the form of a tokenized request. The request token includes a data object that includes plaintext data and a suggested context for the data. The request token includes a request context and a digital signature of the requester.

In various implementations, the tokenization request is authenticated using a number of factors. At block 604, the data broker determines the identity of the requester. This can be accomplished by determining the network address of the requester, or by verifying credentials of the requester supplied with the request. Access controls maintained by the data broker specify requesters that are authorized to submit tokenization requests. If the requester is not authorized to submit the tokenization request, the data broker determines 606 that the request is denied and execution advances to block 608. At block 608, the requester is sent an indication that the request has been denied. If the requester is authorized to submit the tokenization request, execution advances to block 610.

At block 610, the data broker determines the context of the tokenization request. The context of the tokenization request can be determined by examining the request token, and in certain situations, can be different than the context of the requester. In some implementations, the tokenization request may have proceeded through multiple intermediate services, and the tokenization request may include multiple intermediate contexts. When the tokenization request has one request context, the data broker uses an access control module to determine when a particular request context allows a tokenization request. In some implementations, when a tokenization request includes multiple contexts, a request will be authorized when any context of the multiple contexts is allowed to submit tokenization requests. In another implementation, when a tokenization request includes multiple contexts, each context of the multiple contexts must be allowed to submit tokenization requests for the request to be authorized. If the data broker determines 612 that the context of the request does not authorize the tokenization request, execution proceeds to block 614. At block 614, the requester is sent a notification that the request is denied. If the data broker determines 612 that the context of the request allows the tokenization request, execution proceeds to block 616.

At block 616, the data broker determines the context of the data to be tokenized. In some implementations, the data broker does not use a suggested context, and instead infers the context of the data from the identity of the caller and the context of the request. In other implementations, the data broker uses a data context supplied with the plaintext data in the request, and authorizes the assignment of the suggested context based on the identity of the requester and the context of the request. Once the context of the data is determined, the data broker determines whether the identity of the requester and the context of the request are compatible with the context of the data. In various implementations, access control information maintained by the data broker specifies which identities and which request contexts are allowed to tokenize data with a given data context. In some implementations, tokenization of data is allowed when either identity of the requester or context of the request allows the tokenization of data that has the determined data context. In another implementation, tokenization of data is allowed when the context of the request matches the context of the data. In yet another implementation, the data broker maintains an access control list that specifies a list of compatible request context for each data context, and when the request context is one that allows tokenization for the determined data context, the request is allowed. If the data broker determines 618 that the request context is not allowed to tokenize data with the determined data context, execution proceeds to block 620 where the data broker provides the requester with an indication that the request is denied. If the data broker determines 618 that the request context is allowed to tokenize data with the determined data context, execution proceeds to block 622 where the data broker assembles a response token.

The response token includes a token value generated for the data, the token having a data context determined by the data broker, and the token being signed by the data broker. The plaintext data and the generated token value are stored in a token store by the data broker. At block 624, the response token is provided to the requester.

Figure 7:
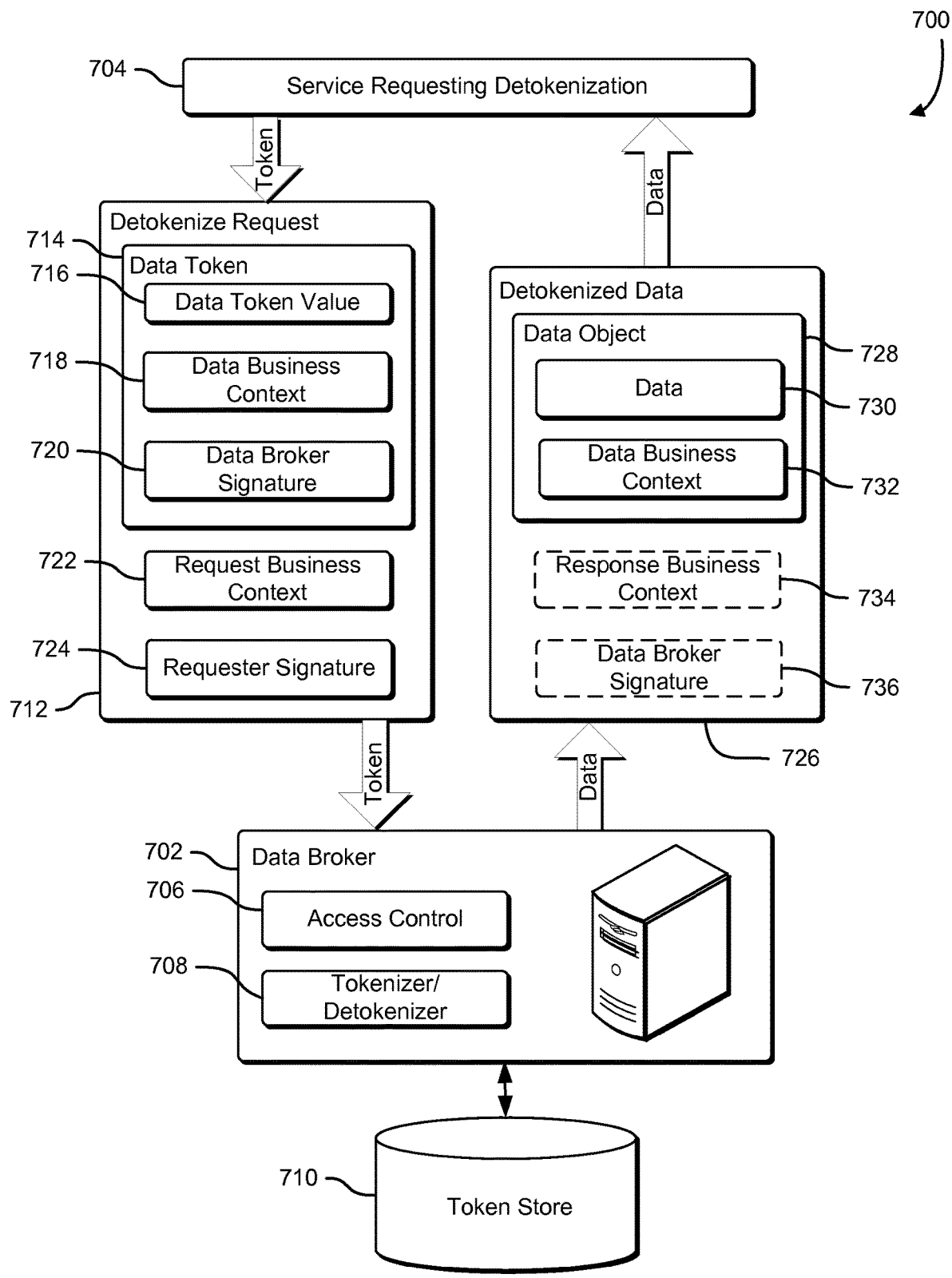
FIG. 7 shows an illustrative example of a data broker that detokenizes data, in accordance with an embodiment.

FIG. 7 shows an illustrative example of a data broker that detokenizes data, in accordance with an embodiment. A diagram 700 shows a data broker 702 processing a request from a requesting service 704 to detokenize tokenized data. The data broker 702 includes an access control module 706 and a tokenizer/detokenizer module 708. The access control module 706 includes access control information and executable instructions that, when executed, control access to the tokenization and detokenization functions of the data broker 702. The tokenizer/detokenizer module 708 maintains a database of plaintext data and associated token values in a token store 710. The tokenizer/detokenizer module 708 includes executable instructions that, when executed, retrieve plaintext data associated with the specified token, or generate a token for provided plaintext data.

When the requesting service 704 produces a request to detokenize data, the requesting service 704 generates a detokenize request token 712. The detokenize request token 712 includes a data token 714 to be detokenized. The data token 714 includes a data token value 716, a data context 718, and an authenticating signature 720. In some implementations, the authenticating signature 720 is a signature of a data broker that tokenized the data. For example, in FIG. 7, the authenticating signature 720 is a signature of the data broker 702. The detokenize request token 712 includes a request context 722 and a requester signature 724. In some implementations, the requester signature is the signature of the requesting service 704. The request context 722, in some implementations, is the context of the requesting service 704.

When the data broker 702 receives the detokenize request token 712, the access control module 706 determines whether the request is authorized. In part, the data broker authenticates the request by validating the requester signature 724. In some implementations, the data broker 702 determines whether the request is authorized based at least in part on the identity of the requesting service 704. In another implementation, the data broker 702 determines whether the request is authorized based at least in part on the request context 722. In yet another implementation, the data broker determines whether the request is authorized based at least in part on a relationship between the request context 722 and the data context 718. For example, some implementations determined that the request is authorized when the request context 722 is equal to the data context 718. In another example, the access control module 706 maintains a list of access information that specifies specific request contexts that are allowed to access particular data contexts. When the list of access control information specifies that the request context 722 is allowed to detokenize data in the data context 718, the request is authorized. In some implementations, the request will be denied if the authenticating signature 720 does not match the signature of the data broker 702.

When the request is authorized, the data broker 702 retrieves the data token value 716 from the detokenize request token 712. Using the data token value 716, the plaintext data is retrieved from the token store 710.

The data broker 702 produces a detokenized data response 726. The detokenized data response 726 includes a data object 728. The data object 728 includes a plaintext data field 730 and a data context 732. In many scenarios, the data context 732 matches the data context 718. The plaintext data field 730 contains the detokenized plaintext data associated with the data token value 716. The detokenized data response 726 includes a response context 734 and a response digital signature 736. The response context is the context of the data broker 702, and the response digital signature 736 is the digital signature of the data broker 702.

In some embodiments, the data context field 734 and the response digital signature 736 are omitted from the detokenized data response 726. The requesting service 704 queries the data broker 702, which retains the data context and digital signature for the data. The data broker 702 provides the data context and digital signature on demand, thereby eliminating the necessity of transmitting this information with the detokenized data response 726.

Figure 8:
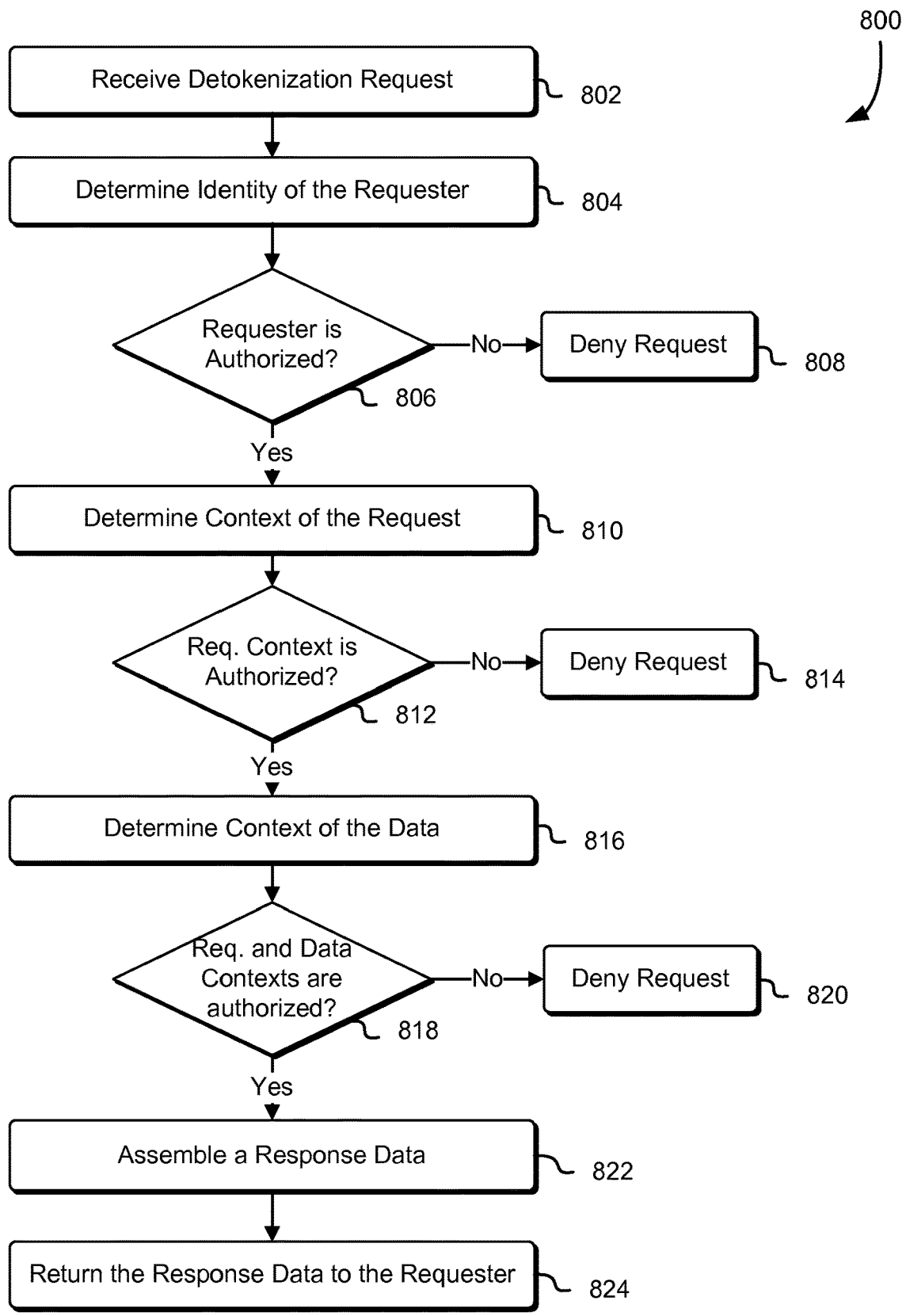
FIG. 8 shows an illustrative example of a process that, when performed by a data broker, detokenizes tokenized data in accordance with an embodiment.

FIG. 8 shows an illustrative example of a process that, when performed by a data broker, detokenizes tokenized data in accordance with an embodiment. A flowchart 800 illustrates a process that begins at block 802 where the data broker receives a request to detokenize data. In some implementations, the request takes the form of a tokenized request. The request token includes a data object which includes a token value and a context for the token value. The request token includes a request context and a digital signature of the requester.

In various implementations, the detokenization request is authenticated using a number of factors. At block 804, the data broker determines the identity of the requester. This can be accomplished by determining the network address of the requester, or by verifying credentials that the requester supplies with the request. Access controls maintained by the data broker specify requesters that are authorized to submit detokenization requests. If the requester is not authorized to submit the detokenization request, the data broker determines 806 that the request is denied and execution advances to block 808. At block 808, the requester is sent an indication that the request has been denied. If the requester is authorized to submit the detokenization request, execution advances to block 810.

At block 810, the data broker determines the context of the detokenization request. The context of the detokenization request can be determined by examining the request token, and in certain situations, can be different than the context of the requester. In some implementations, the detokenization request is processed by a number of intermediate services, and the detokenization request includes a number of encapsulated intermediate contexts. When the detokenization request has one request context, the data broker uses access controls that specify request contexts that are allowed to submit detokenization requests. In some implementations, when a detokenization request includes a number of contexts, the request will be allowed when any context of the number of contexts is allowed to submit detokenization requests. In another implementation, when a detokenization request includes a number of contexts, each context of the number of contexts must be allowed by the access controls to submit detokenization requests for the request to be authorized. If the data broker determines 812 that the request having the request context is not authorized to detokenize the token, execution proceeds to block 814. At block 814, the requester is sent a notification that the request is denied. If the data broker determines 812 that the request with the request context is authorized to detokenize the token, execution proceeds to block 816.

At block 816, the data broker determines the context of the data to be detokenized. The context of the data is included with the data token and is confirmed by digital signature. In some implementations, the digital signature is the signature of a data broker. In other implementations, the digital signature is the digital signature of the requester. Once the context of the data is determined, the data broker determines whether the identity of the requester and the context of the request are compatible with the context of the data. In various implementations, access control information maintained by the data broker specifies which identities and which request contexts are allowed to detokenize data with a given data context. In some implementations, detokenization of data is allowed when either the identity of the requester or the context of the request allows the detokenization of data that has the determined data context. In another implementation, detokenization of data is allowed when the context of the request matches the context of the data. In yet another implementation, the data broker maintains an access control list that specifies a list of compatible request contexts for each data context, and when the request context is one that allows detokenization for the determined data context, the request is allowed. If the data broker determines 818 that the request context is not allowed to detokenize data with the determined data context, execution proceeds to block 820 where the data broker provides the requester with an indication that the request is denied. If the data broker determines 818 that the request context is allowed to detokenize data with the determined data context, execution proceeds to block 822 where the data broker assembles a response token.

The data broker uses the value of the token to retrieve the plaintext data associated with the token. The response token includes the plaintext data, and the context of the data. At block 824, the response token is provided to the requester.

In some embodiments, only partial detokenization of a data token is allowed based on the context of the request. For example, a particular request context may be allowed to retrieve the last four digits of a credit card number that is represented by a data token, and a different request context may be allowed to detokenize the entire credit card number. The degree of detokenization of a particular token can be determined based at least in part on the identity of the requester and/or the context of the request.

Figure 9:
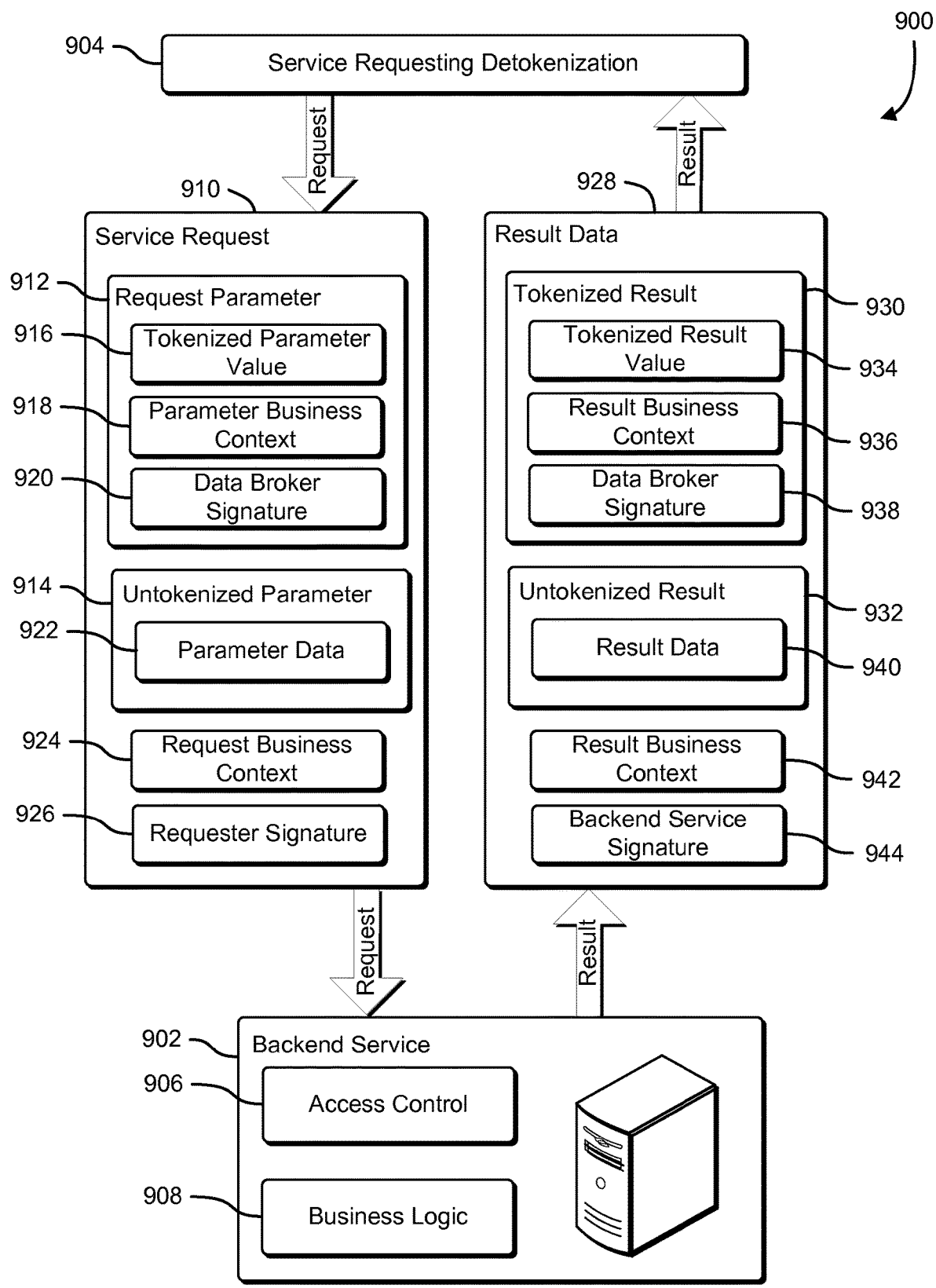
FIG. 9 shows an illustrative example of a shared service processing a tokenized request, in accordance with an embodiment.

FIG. 9 shows an illustrative example of a shared service processing a tokenized request, in accordance with an embodiment. A diagram 900 includes a backend service 902 that is exchanging information associated with a service request submitted by a requesting service 904. The backend service 902 includes an access control module 906 and a business logic API 908. The access control module 906 includes access control information that specifies when various routines in the business logic API are accessible. Executable instructions within the access control module 906, when executed, evaluate the origins and context of incoming requests to determine whether particular incoming requests will be granted or denied. The business logic API 908 provides an interface to executable code modules that, when executed, perform various business or service functions.

When the requesting service 904 submits a request to the backend service 902, a service request token 910 is generated by the requesting service 904. The service request token 910 includes a tokenized request parameter 912 and an untokenized parameter 914. In various implementations, service requests can include zero or more tokenized request parameters and zero or more untokenized parameters. For example, a particular service request token may include three tokenized request parameters and two untokenized parameters. In another example, the particular service request may include one tokenized request parameter and no untokenized parameters. The tokenized request parameter 912 includes a tokenized parameter value 916, a tokenized parameter context 918 and an authorizing signature 920. In some embodiments, the authorizing signature is a data broker signature. The untokenized parameter 914 includes a parameter data 922 field that contains plaintext data. The service request token 910 includes a request context 924 and a requester signature 926. In many implementations, the request context 924 is the context of the requesting service 904, and the requester signature 926 is the digital signature of the requesting service 904.

When the backend service 902 receives the service request token 910, the access control module 906 determines whether the request is authorized. In various implementations, the access control module identifies the requesting service based on the origin of the request and/or credentials provided by the requesting service 904 when the request is submitted. Information in the access control module 906 identifies the set of requesting services that are allowed to submit requests to the backend service 902. If the requesting service 904 is not authorized, the request is denied. In additional implementations, the backend service 902 authorizes the request based at least in part on the request context 924. Information in the access control module 906 identifies the set of request contexts that are allowed to submit requests to the backend service 902. If the request context 924 is not authorized, the request is denied. In some implementations, the backend service 902 authorizes the request based at least in part on the parameter context 918. The access control module 906 examines the request context 924 and the parameter context 918. If the request context 924 and the parameter context 918 are compatible, the request is authorized. In some implementations, the request context 924 and the parameter context 918 are compatible when the request context 924 and the parameter context 918 are identical. In another implementation the request context 924 and the parameter context 918 are compatible when information in the access control module 906 specifies that the two contexts are compatible. For example, in some implementations, the access control module 906 includes a table with data/request context pairs that are determined to be compatible. If the backend service 902 determines that the request is authorized, the requested API in the business logic API 908 is executed.

When the backend service 902 performs the requested operation, a result data token 928 is provided to the requesting service 904. The result data token 928 includes a tokenized result 930 and an untokenized result 932. The result data token 928 may include, in some implementations, other numbers of tokenized results and other numbers of untokenized results. The tokenized result 930 includes a tokenized result value 934, a result context 936, and a tokenized result signature 938. The untokenized result 932 includes a result data field 940 that contains plaintext data. The result data token 928 further includes a result context 942 and a backend service signature field 944. In many implementations, the result context 942 is the context of the backend service 902 and the backend service signature field 944 is the digital signature of the backend service 902.

When the requesting service 904 receives the result data token 928, it validates the signature of the backend service 902 in the backend service signature field 944. The requesting service 904 can use the result data field 940 in the untokenized result 932 without detokenization. The tokenized result 930 can be used by the requesting service 904 in tokenized form, or the tokenized result 930 can be detokenized by sending a request to an appropriate data broker.

Figure 10:
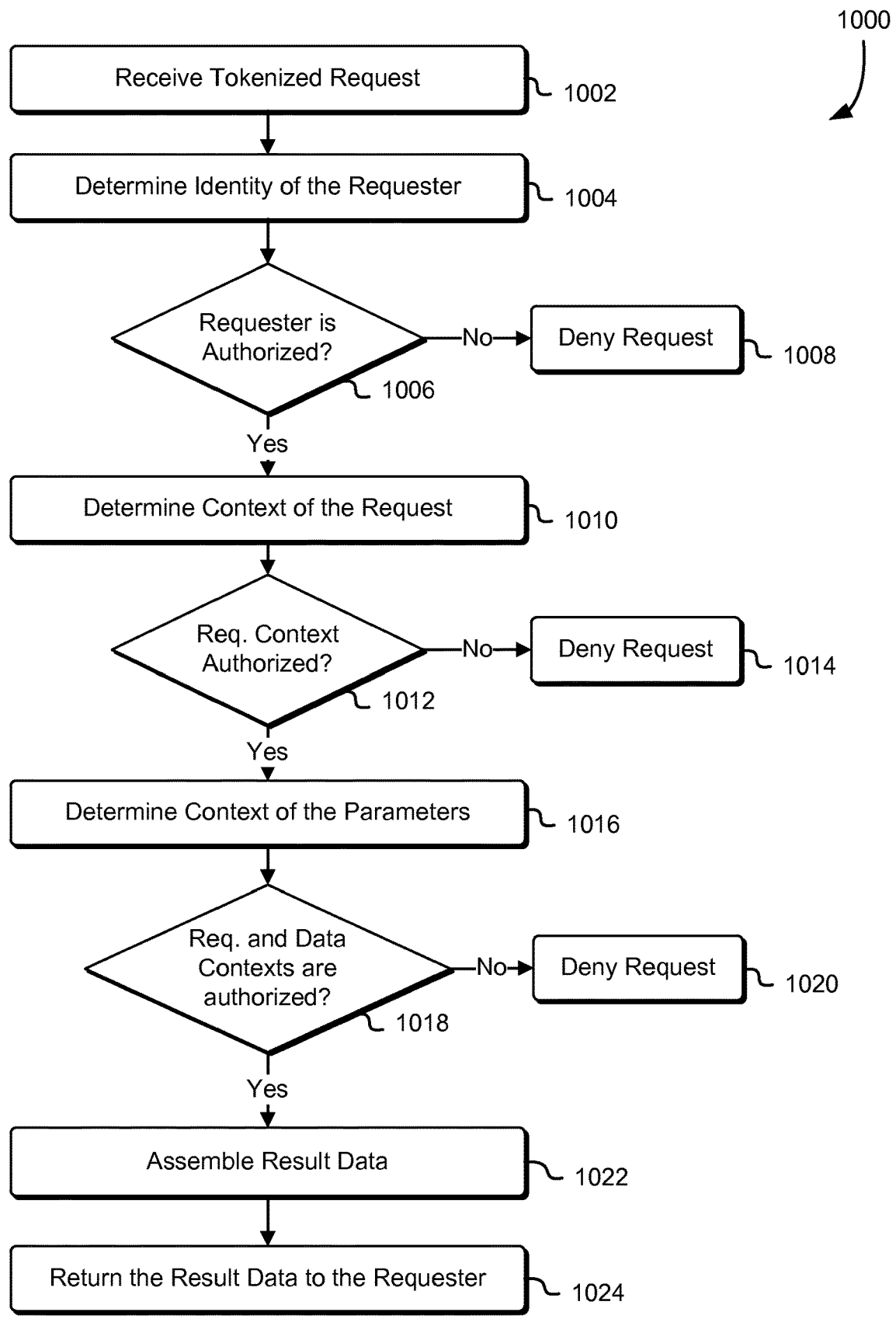
FIG. 10 shows an illustrative example of a process that, when performed by a shared service, authorizes a tokenized request in accordance with an embodiment.

FIG. 10 shows an illustrative example of a process that, when performed by a shared service, authorizes a tokenized request in accordance with an embodiment. A flowchart 1000 illustrates a process that begins at block 1002 where the shared service receives a tokenized request. The shared service exposes a number of APIs to other services within the service platform. The tokenized request provides a request context, and in some situations, tokenized parameters, untokenized parameters, and context for the tokenized and untokenized parameters. In some implementations, the tokenized request includes a request to execute code associated with a particular API exposed by the shared service. In additional implementations, the tokenized request is provided to the shared service when the caller calls the particular API exposed by the shared service. The tokenized request includes a request context that is signed by the requester, and in some situations additional request contexts that are signed by requesters that are higher in a request hierarchy. In some implementations, the tokenized request includes parameters that are provided to the particular API exposed by the shared service.

In various implementations, the tokenized request is authenticated using a number of factors. At block 1004, the shared service determines the identity of the requester. This can be accomplished by determining the network address of the requester, or by verifying credentials that the requester supplies with the request. Access controls maintained by the shared service specify requesters that are authorized to submit tokenized requests. If the requester is not authorized to submit the tokenized request, the shared service determines 1006 that the request is denied and execution advances to block 1008. At block 1008, the requester is sent an indication that the request has been denied. If the requester is authorized to submit the tokenized request, execution advances to block 1010.

At block 1010, the shared service determines the context of the tokenized request. The context of the tokenized request can be determined by examining the request token, and in certain situations, may be different than the context of the requester. In some implementations, the tokenized request has been submitted based at least in part on other tokenized requests, and the tokenized request includes a number of encapsulated request contexts from previous processing. When the tokenized request has one request context, the shared service uses access controls that specify request contexts that are authorized to submit tokenized requests to execute the particular API. In some implementations, when a tokenized request includes a number of contexts, the request will be authorized when any context of the number of contexts is authorized to submit tokenized requests. In another implementation, when a tokenized request includes a number of contexts, each context of the number of contexts must be authorized by the access controls to submit tokenized requests for the request to be authorized. If the shared service determines 1012 that the request context or contexts do not authorize the tokenized request, execution proceeds to block 1014. At block 1014, the requester is sent a notification that the request is denied. If the shared service determines 1012 that the request context or contexts authorize the tokenized request, execution proceeds to block 1016.

At block 1016, the shared service determines the context of the parameters associated with the tokenized request. The context of the parameters is included with the parameters that are encapsulated in the tokenized request. In some implementations, the context of the parameters are confirmed using digital signatures such as the signature of a shared service. Once the context of the parameters are determined, the shared service determines whether the identity of the requester and the context of the request are compatible with the context of the parameters. In various implementations, access control information maintained by the shared service specifies requester identities and request contexts that are authorized to submit tokenized requests with a given request context. In additional implementations, access control information maintained by the shared service specifies request contexts that are compatible with parameter contexts. In some implementations, processing of a tokenized request is authorized when either the identity of the requester or the context of the request allows the processing of the tokenized request. In another implementation, processing of the tokenized request is authorized when the context of the tokenized request matches the context of the parameters. In yet another implementation, the shared service maintains access controls that specify parameter contexts that are compatible with request contexts. When the context of the tokenized request is compatible with the context of the parameters provided with the request, the tokenized request is authorized and processed by the shared service. If the shared service determines that the tokenized request context is not compatible with the context of the associated request parameters, execution proceeds to block 1020 where the shared service provides the requester with an indication that the request is denied. If the shared service determines that the tokenized request context is compatible with the context of the associated parameters, execution proceeds to block 1022 where the shared service performs the requested operation, such as calling a particular API, and assembles a result data.

If the tokenized request is authorized, the shared service extracts the parameters associated with the tokenized request. In some implementations, the shared service detokenizes tokenized parameters. In another implementation, the shared service extracts plaintext parameters from the tokenized request. The shared service determines the operation requested and performs the operation, supplying the provided parameters. In various implementations, a result data is assembled that includes results of the performed operation. The result data may include tokenized results and/or plaintext results. At block 1024, the result data is provided to the requester.

Figure 11:
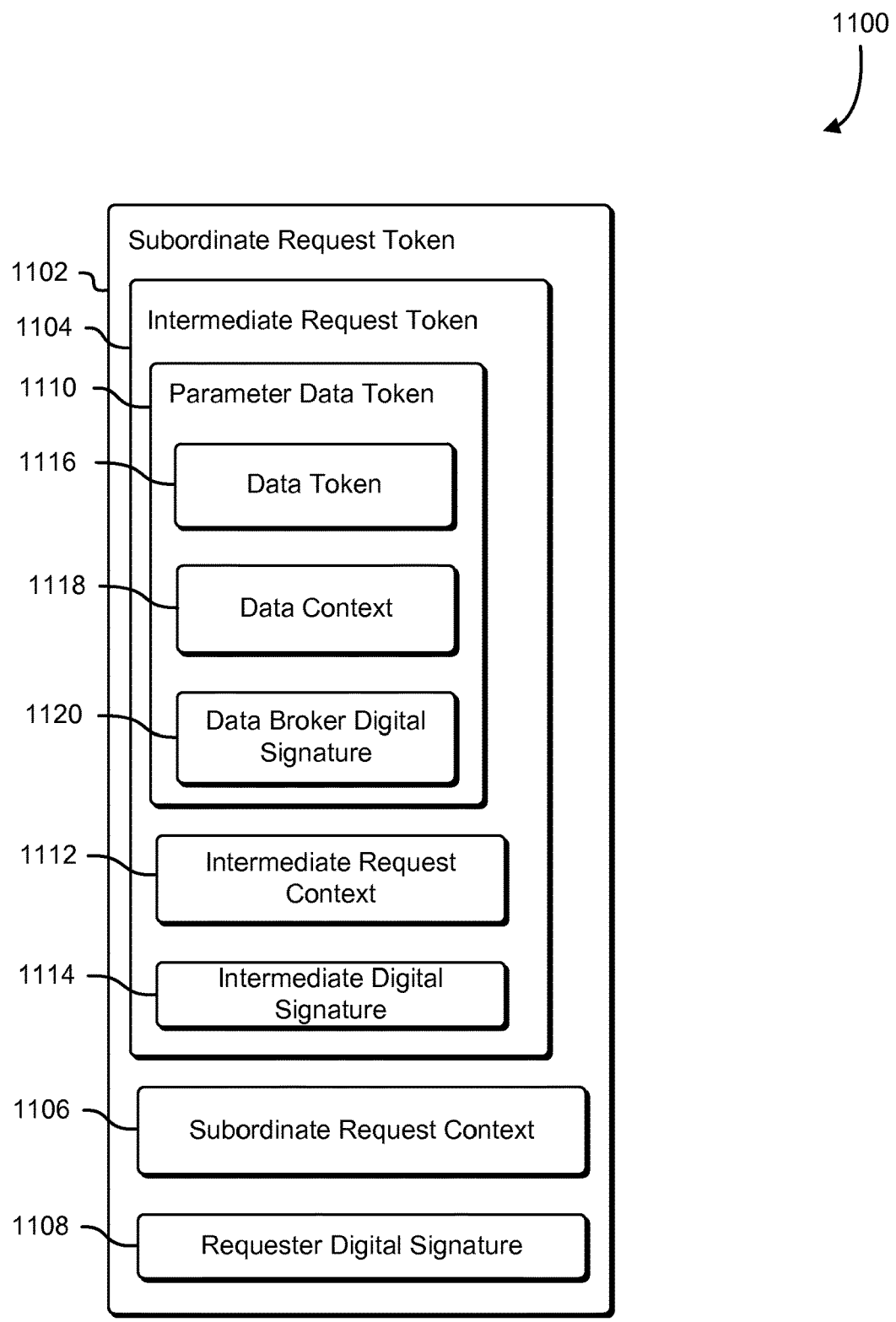
FIG. 11 shows an illustrative example of a tokenized request, in accordance with an embodiment.

FIG. 11 shows an illustrative example of a tokenized request, in accordance with an embodiment. A diagram 1100 shows a subordinate request token 1102 that encapsulates an intermediate request token 1104, a subordinate request context 1106, and a requester digital signature 1108. The subordinate request context 1106 is the context of the requesting service. The requester digital signature 1108 is the digital signature of the requesting service. In the example shown in diagram 1100, the intermediate request token 1104 encapsulates a parameter data token 1110. In additional implementations, the intermediate request token 1104 can include a plurality of parameter data tokens. In some implementations, the subordinate request token 1102 includes additional parameter data tokens.

The intermediate request token 1104 is a token that, in many scenarios, is generated by a service other than the requesting service such as a frontend service. For example, in a particular scenario, a frontend service makes a request to an intermediate shared service by creating an intermediate request token and sending the intermediate request token to the intermediate shared service. The intermediate shared service calls a backend service by encapsulating the intermediate request token in a request token generated by the intermediate shared service. When the backend service receives the request token, it extracts information from the request token and the intermediate request token, and authenticates the request based on the context of the intermediate request token, the context of the request token, and the context of any parameters encapsulated with the request token or the intermediate request token. In diagram 1100, the intermediate request token 1104 includes an intermediate request context 1112 and an intermediate digital signature 1114. The intermediate request context 1112 and the intermediate digital signature 1114 are associated with an entity that provided the intermediate request token 1104 to the requesting service.

In various implementations, the intermediate request token 1104 includes a parameter data token 1110 that has a data token 1116, a data context 1018, and a data broker digital signature 1120. In additional embodiments, the intermediate request token 1104 includes a number of parameter data tokens or, in addition to a number of parameter data tokens, plaintext parameters. The data token 1116 can be detokenized by the data broker to provide a plaintext parameter, or encapsulated and included with a further request to another service within the service platform. The data context 1118 is the context of the data, and the data broker digital signature 1120 may be used to authenticate the contents of the parameter data token 1110.

In various implementations, request tokens may encapsulate other request tokens and parameter data. For example, a frontend service may produce a request token having the context and signature of the frontend service, that is sent to an intermediate service. The intermediate service encapsulates the request token, along with any parameters included with the request token, to form an intermediate request token. The intermediate service may encapsulate additional parameters into the intermediate request token. The intermediate request token has a context of the intermediate service and is signed by the intermediate service. The intermediate request token can be sent to a backend service. The backend service includes an access control module that authenticates the received intermediate request using the context information and signature of the original request, the context and signature of the intermediate request token, and the context and signature associated with any parameters included with either request. In some embodiments, the intermediate request token can be encapsulated by yet another request token and sent to yet another backend service. Access control modules within intermediate, backend, or frontend services of the service platform can be adapted to use this data and request context to provide flexible and useful access controls.

Figure 12:
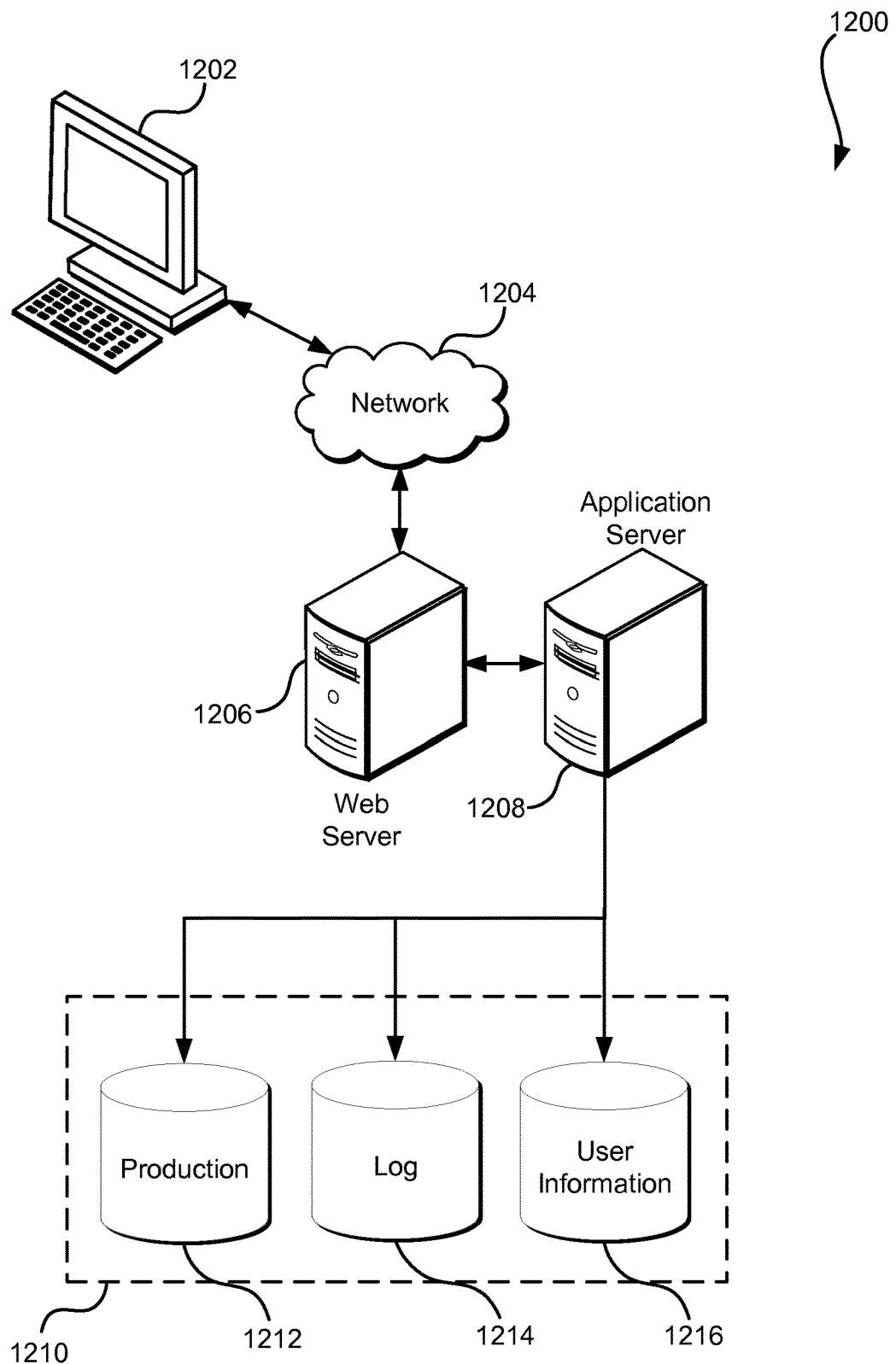
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures. Validating a digital signature verifies the integrity of the content signed.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order or in parallel unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method to facilitate sharing of online services by multiple client-facing service, the method comprising:
    obtaining, by an online service, personal information from a client;
    obtaining by a backend entity from the online service the personal information and a data context for the personal information, wherein the data context is signed by the online service;
    storing, by the backend entity, the personal information and the data context;
    providing, by the backend entity to the online service, a data token for the personal information and the data context;
    obtaining, by the backend entity, a request from the online service, the request including:
        a request context that is signed by the online service; and
        the data token that is detokenizable to return the personal information, and
    validating integrity of the request, at least in part by cryptographically verifying the request context and the data context;
    determining that the request is authorized by, at least in part, a determination that the request context and the data context match; and
    as a result of determining that the request is authorized, providing a response to the request that includes the personal information.

2. The computer-implemented method of claim 1, wherein the response further includes a response token value, a response context, and a response signature.

3. The computer-implemented method of claim 1, wherein:
    the request further includes an intermediate request context, wherein the intermediate request context is signed by a service that relayed the request; and
    the request is further authorized based at least in part on the intermediate request context matching the data context.

4. The computer-implemented method of claim 1, further comprising:
    obtaining from a different online service a different request that includes the data token and a different request context, wherein the different request is for the personal information; and
    as a result of the different request context not matching the data context, deny the different request.

5. A system to facilitate sharing of online services, the system comprising at least one computing device implementing one or more services, wherein the one or more services at least:
    receive personal information;
    obtain by a backend entity from an online service, a data context for the personal information wherein the data context is signed by the online service and provides an identification of the online service;
    store the personal information;
    provide by the backend service to the online service a data token for the personal information and the data context;
    receive, by the backend entity, a request, the request including:
        a request context signed by the online service, and
        the data token, the data token detokenizable to return the personal information,
    determine that the request is authorized based at least in part on a determination that the data context and the request context match; and
    as a result of determining that the request is authorized, provide a response that includes the personal information.

6. The system of claim 5, wherein:
    the request context is a GUM contained within a request data structure; and
    the data context is prepended to the data token as a string.

7. The system of claim 5, wherein:
    the request includes a request cryptographic authenticator; and
    the one or more services cryptographically verify the request using the cryptographic authenticator based at least in part on the request context.

8. The system of claim 5, wherein:
    the request includes a data cryptographic authenticator; and
    the one or more services further cryptographically verify the request using data cryptographic authenticator based at least in part on the data token and the data context.

9. The system of claim 5, wherein the one or more services further determine that the request is authorized based at least in part on an identity of a requester.

10. The system of claim 5, wherein the one or more services determine that the request is authorized based at least in part on determining that the combination of the request context with the data context is represented within access control information in an access control module.

11. The system of claim 5, wherein the one or more services fulfill the request at least in part by encapsulating the request context in a subordinate request and providing the subordinate request to another system.

12. The system of claim 5, wherein:
    the response includes a response context; and
    the response includes a digital signature of the response context.

13. A non-transitory computer-readable storage medium having stored thereon executable instructions that, as a result of being executed by one or more processors of a computer system, cause the computer system to at least:
    receive personal information;
    obtain by a backend entity from an online service a data context for the personal information, wherein the data context is signed by the online service, wherein the online service provided the personal information;
    store the personal information;
    provide by the backend entity to the online service a data token for the personal information and the data context;
    receive by the backend entity a request, the request including:
        an encapsulated-request-context that is signed by the online service,
        the data token, the data token detokenizable to return the personal information, and
        an encapsulated-request-context cryptographic authenticator;

validate the encapsulated request context with the encapsulated-request-context cryptographic authenticator;

determine that the request is authorized based at least in part on a determination that the data context and the encapsulated request context match; and as a result of determining that the request s authorized, provide a response that includes the personal information.

14. The non-transitory computer-readable storage medium of claim 13, wherein the instructions further comprise instructions that, as a result of being executed by the one or more processors, cause the computer system to fulfill the request by:

encapsulating the request in a subordinate request having a subordinate request cortex applying a cryptographic authenticator to the subordinate request; and providing the subordinate request to a service provider.

15. The non-transitory computer-readable storage medium of claim 13, wherein:

the request further includes a data token context; and wherein the request is determined to be authorized based at least in part on the data token context.

16. The non-transitory computer-readable storage medium of claim 13, wherein:

the request further includes an encapsulated data token and an encapsulated data token context; and the instructions further comprise instructions that, as a result of being executed by the one or more processors, cause the computer system to determine that the request is authorized based at least in part on the encapsulated data token context.

17. The non-transitory computer-readable storage medium of claim 13, wherein the instructions further comprise instructions that, as a result of being executed by the one or more processors, cause the computer system to return a response with a signed response context to a requester.

18. The non-transitory computer-readable storage medium of claim 13, wherein the instructions further comprise instructions that, as a result of being executed by the one or more processors, cause the computer system to determine that the request is authorized based at least in part on the encapsulated request context by determining that the encapsulated request context is allowable with the request context.

19. The non-transitory computer-readable storage medium of claim 13, wherein the request is received via inter-process communication.

20. The non-transitory computer-readable storage medium of claim 13, wherein the instructions further comprise instructions that, as a result of being executed by the one or more processors, cause the computer system to determine that the request is authorized by at least determining that the encapsulated request context is authorized, the request context is authorized, and a requester is authorized.

* * * * *